May 23, 1961    J. B. BRENNAN    2,985,803
REINFORCED ELECTRODE AND METHOD OF MAKING SAME
Filed April 1, 1953
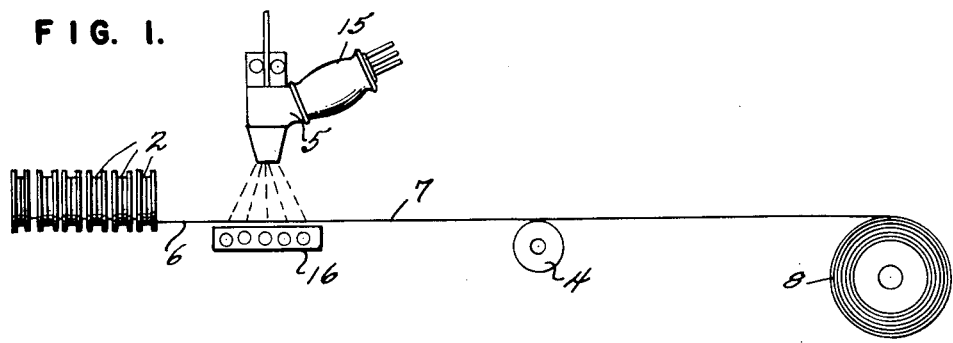
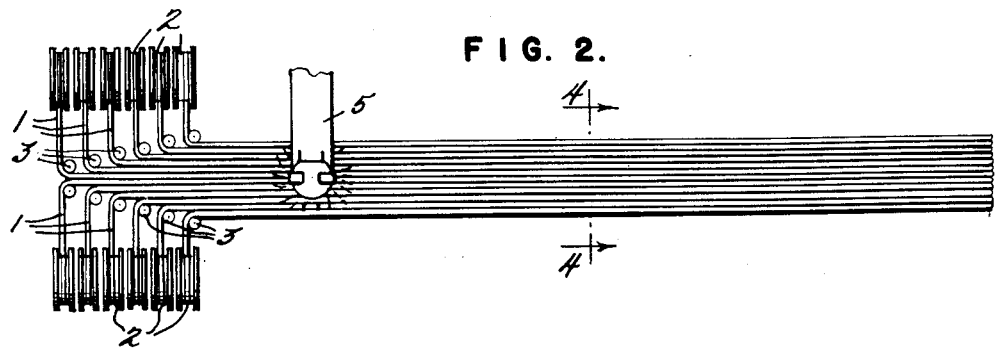
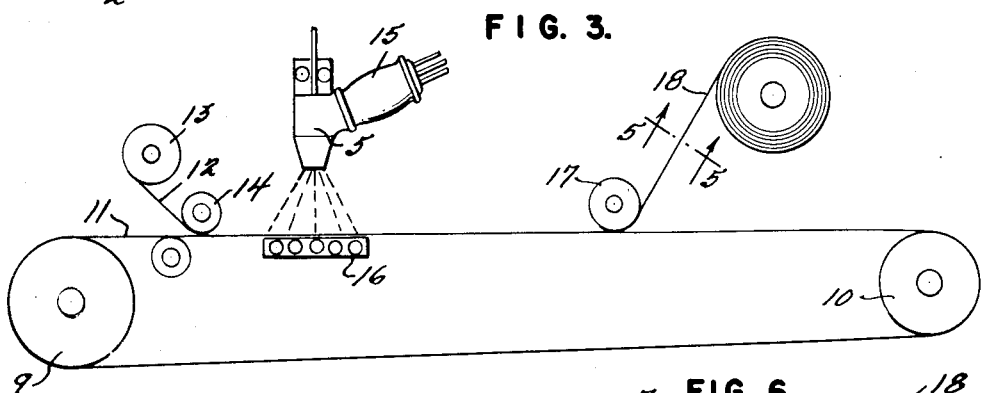
INVENTOR
JOSEPH B. BRENNAN
BY Young, Emery + Thompson
ATTORNEYS

United States Patent Office 2,985,803
Patented May 23, 1961

2,985,803
REINFORCED ELECTRODE AND METHOD OF MAKING SAME

Joseph B. Brennan, 13018 Lake Shore Blvd., Cleveland, Ohio; Helen E. Brennan, executrix of Joseph B. Brennan, deceased Filed Apr. 1, 1953, Ser. No. 346,113

3 Claims. (Cl. 317—230)

This invention relates to electrodes for electrolytic devices and particularly relates to a reinforced electrode and method of making same wherein the electrode is adapted for use in electrolytic condensers, batteries, rectifiers, and the like and is of the type that normally has electro-formed dielectric films thereon.

The present application comprises a continuation-in-part of my copending application Serial No. 83,424, filed March 25, 1949, now abandoned, which in turn is a continuation-in-part of my application Serial No. 699,108, filed September 25, 1946, issued on December 18, 1951, as Patent No. 2,578,667.

My earlier application, previously referred to, relates to the formation of electrodes from a layer of reinforcing cords or strands which have a porous metallic coating integrally associated therewith. These electrodes may have spaced reinforcing cord or strands also associated therewith in addition to the layer of reinforcing cords that form a base for the porous metal layer. One phase of the present invention is directed to the use of a minimum number of reinforcing strands in a porous metallic sheet or strip so as to form an electrode having maximum capacity per unit volume and great tensile strength.

Another phase of the present invention relates to an electrode formed entirely of porous metal deposited about and within a strip of parallel cords.

The general object of the present invention is to provide a compact, efficient electrode of the class described.

Another object of the invention is to provide an effectively reinforced porous metallic electrode which has desirable physical properties.

A further object of this invention is to provide a thin flexible porous electrode having unusually high tensile strength for a given thickness.

Still another object of the invention is to provide an electrode which is made by an inexpensive method and which has sufficient physical strength to permit it to be processed into ultimate size and condition without damage thereto or breakage thereof.

A still further object of this invention is to provide methods of making electrodes having the desirable characteristics set forth hereinabove.

The foregoing and other objects and advantages of the invention will be made more apparent as the specification proceeds.

Attention is now particularly directed to the accompanying drawings, wherein:

Fig. 1 is a diagrammatic elevation of apparatus for performing the method according to one form of the invention;

Fig. 2 is a plan of the apparatus of Fig. 1;

Fig. 3 is an elevation of a diagrammatic means for performing a modification of the method of the invention;

Fig. 4 is a transverse section taken on line 4—4 of Fig. 2;

Fig. 5 is another sectional view taken on line 5—5 of Fig. 3;

Fig. 6 is a view similar to that of Fig. 5 of a modified form of electrode strip; and Fig. 7 is a similar cross sectional view of another modification.

The present invention is directed to electrode strips including a backing or support formed of a plurality of parallel cords. These cords may be spaced apart or may be close together, even touching each other, prior to fabrication of the electrode strip depending upon the character of the electrode strips to be formed.

Reference is now made to the details of the structure shown in the drawings. As shown in Figs. 1, 2 and 4, the backing strip or support is composed of a plurality of parallel cords or strands 1 which may be formed from any suitable material which will not contaminate the electrode, or the electrolyte to be associated with the electrode, and such materials may be purified cotton or other cellulosic filaments, rayon, or other plastic filaments, asbestos fibers, fiber glass, quartz filament or other fused refractory filaments or cords, metal filaments, and the like. The strands 1 are positioned upon storage reels 2 and pass therefrom around guide rolls 3 which associate or position and retain the strands 1 in desired parallel relationship to each other. Means, not shown, are associated with the cords or strands 1 to maintain them under tension between the rollers 3 and the rollers 4. While under tension, the relative positions of the cords or strands 1 are substantially fixed and a support or backing strip 6 is provided for reception of sprayed metal. A conventional metal spray device of any known type, in this instance a spray pistol 5, is positioned adjacent the rolls 3. The base strip 6 is continuously moved past the pistol 5 and the pistol 5 is adapated to spray plastic metal particles onto the base strip 6 in such a manner as to coalesce the deposited metal particles with each other and with the base strip so as to form a porous metallic layer which is intimately bonded to the cords of the base strip and which has fibers therefrom extending into the so formed metallic sheet. As a particular feature of the invention, the strands 1 are completely embedded in the deposited metal of the resultant electrode strip 7 which is produced by deposit of the metal onto the base strip so as to bond the strands 1 together. Usually the electrode strip 7 is deposited upon a suitable take-up reel 8 that is driven so as to pull the base strip 6 continuously through the apparatus of the invention at a constant rate and maintain proper uniform tension on the cords 1. Fig. 4 shows that the strands 1 are surrounded by porous metal on all sides and sheathed therein. If desirable, the bottom of the sprayed strip 6 may be sprayed to increase the thickness and capacity and exposed area of the strip and multiple layers of particulate metal and cords may be fabricated and joined by particulate metal bond so that conductive metal extends continuously all around and along the cords.

The base strip 6 may be of any desired size and thickness and usually is several inches wide and anywhere from one to three to ten thousandths of an inch thick. Likewise, the porous metal layer produced will be several inches wide and of from about three to about ten thousandths of an inch in thickness.

It is important according to the present invention that the sprayed metal particles penetrate between and around the adjacent cords or strands 1 and bond them together, whereby they are sheathed in the deposited metal.

The cords 1 should be so spaced and/or under such tension, and/or of such porosity that the particles of heat plasticized metal will penetrate between the adjacent cords. According to this invention the velocity and size of the metal particles must be such that they will penetrate between adjacent cords even when adjacent cords touch each other. Also, it is preferable that the cords be made of twisted fibers so that the metal particles can penetrate into the cords as well as between adjacent cords.

A modified apparatus adapted to produce a slightly different electrode strip of the invention is shown in Fig. 3 and in this instance rolls 9 and 10 position an endless backing belt 11 for movement around a predetermined path. The backing belt 11 preferably has a smooth surface to which the molten metal does not permanently bond. Suitable materials from which the belt 11 may be formed are stainless steel, or anodized aluminum or ceramic material. In Fig. 3, a plurality of reinforcing cords 12 are carried on spools 13 and guided into spaced parallel relation onto a predetermined portion of the backing belt 11 by means of roller or guide spools 14. Shortly thereafter, for example in the travel of the backing belt 11, a conventional spray pistol 15 will be used to deposit metallic particles onto and into the spaced cords and through the spaces between the cords onto the backing belt 11 so as to coalesce the metallic particles and form a porous strip therefrom in which the cords or strands 12 are embedded. Usually, the belt 11 is cooled adjacent the pistol 15 by a cooling plate 16 over which the belt passes. Fig. 3 also shows that after the backing belt passes under a guide roll 17, a porous metal strip 18 which has the cords or strands 12 embedded therein may be pulled from engagement or association with the backing belt 11. Thus, an electrode strip of great strength can be formed which is free from association with any backing strip. Use of the electrode strip 18 is particularly desirable where maximum capacity is desired in a minimum space since both surfaces of the electrode strip 18 are exposed for electrode action and no extra thickness is provided in the electrode by any backing material. A cross section of such a strip is shown in Fig. 6.

By use of reinforcing strands which are in spaced parallel relation with each other, an electrode strip having satisfactory strength so as to be capable of being self supporting in its processing and forming operations is provided.

Furthermore, it is desirable in some instances to use cords or reinforcing strands positioned at the edges of a spray field which particularly reinforces the deposited material at its weakest points and aid in producing a sprayed strip which is of substantially uniform thickness in a transverse direction, as shown in Fig. 5.

It will be appreciated that in either embodiment of the invention shown herein, a second spraying action can be provided so as to deposit porous metal on both surfaces of either the strip 7 as shown in Fig. 4 or else on the electrode strip 18 shown in Figs. 5 and 6. This second or multiple layer of porous metal may or may not have additional reinforcing strands contained therein, as desired. Additional cords in an added layer are desirable if greatly increased capacity and strength are wanted.

Any desired metal may be used in making the electrodes of the invention and aluminum, magnesium tantalum, or iron or nickel or titanium are examples of such metals. The cells or voids formed in the metal strip are intercommunicating so as to permit electrolyte and other materials to pass therethrough.

It may be possible in some instances to use a plurality of overlapping base strips in place of the base strip 6 so as to provide a wider ultimate sheet of metal. In such instances it might be desirable to use a plurality of spray guns to deposit the metal on the moving base strip or one spray gun may be oscillated over a given area to provide a relatively wide metal deposit.

When refractory cords are used as is especially desirable with high melting point metals such as nickel, iron, or titanium, it is desirable to have the parallel cords heated to assist in the bonding of the metal particles when they are heated and to effect bonding of the particles to the cords and to each other.

The cords may be bonded together with metal particles thermally coalesced or welded thereto and then subsequent layers of particulate metal may be applied thereover.

It will be noted that the base strip 6 is composed of a series of parallel fed cords, threads, or strings. They are such that the metal penetrates into their soft bodies, and they are reinforced by the metal spray, and they, by their porosity, increase the area exposed to the electrolyte, and hence the capacity. The porosity of the particulate metal is greatly increased by the increased surface due to the spreading cohering and penetration around the fibers of the cords and the tensile strength of the resultant strip may be multiplied many times over that obtainable with strip produced without the included cords.

The weaving of fabrics such as is currently practiced, and used extensively in the electrolytic condenser industry, becomes unnecessary, and the parallel cords either in single or multiple layer, accomplish as much and at much less cost. Figure 7 shows a cross section of a strip having two layers of cords embedded therein and bonded together by sprayed metal. Thus a layer of cords incorporated into the electrode strip will equal in strength a layer of fabric having longitudinal cords in equal number and strength as well as woof threads.

Any number of cords may be used. The resultant electrode is conductive throughout and is penetrable by the electrolyte throughout.

Heretofore it has been known to make electrodes by spray depositing particles of molten metal onto fibrous bases of sufficient thickness and density and closeness of fibers whereby the metal particles did not deposit nor stick onto the backing-up surface over which the fibrous base member is placed when being coated.

It is also known to use a fibrous base which is soft and penetrable by the particles but wherein the particles, although they penetrate the base, even though they are visible on the opposite side from which they were applied, adhere more strongly to the fibrous base than they do to the generally fluid-cooled backing member or surface supporting the base, so that the composite strip of fibers and metallic particles so produced is readily removed from the temperature controlled backing-up surface.

Heretofore it has been impractical to spray deposit on an open mesh material or fibrous base material having openings therein larger than the particles of spray deposited material and to readily strip same from the temperature controlled backing-up surface.

According to the present invention, it is possible to produce a continuous elongate strip of material comprising a plurality of spaced parallel cords in which the spaces between them are many times wider than the sizes of the particles of molten metal being sprayed, and to make a porous electrode strip thereby which can be readily removed from a temperature controlled base on which the strip is produced.

The foregoing result is possible because I have discovered that certain surfaces can be made non-adherent and used as backing-up members when temperature controlled so that, whereas the metal would ordinarily stick to surfaces heretofore used when spray deposited thereon, it does not stick to the surfaces used according to this invention.

The result is that a sufficiently strong strip of porous material can be produced having reinforcing threads or cords running therethrough and spaced apart at desired intervals.

In any case, the materials, the wires or threads making up the base material should be of sufficient purity to meet the needs of the required use. Filling in of the openings of the widely spaced strands by laying of a layer of metal particles and sintering same to make a unitary electrode is also contemplated according to this invention.

The economy of materials due to the wide spacing of the reinforcing members introduce a considerable economy of material and labor in the manufacture of electrodes of this type as well as reducing the internal resistance when incorporated in electrolytic cells.

It has been found that according to this invention the power factor losses due to internal resistance in condensers made with the transparent opening between the reinforcing members can be cut or reduced as much as fifty percent (50%) giving greater freedom to the movement of ions and, in storage battery use, greater capacity attainable in a given thickness of plate due to the increased active material retention capacity due to the larger openings.

According to this invention, I am able to spray deposit continuously onto a perforate base material having openings larger than the particle size and strip same continuously without excessive adhesion.

The spacing of the parallel cords is such that the adhesion to the base of the metal thereon between the cords is less than the cohesive particulate bond of the metal between the cords and also less than the bond of the particulate metal to the cords.

It is preferable to use the metallic particles wherein at least 80% are less than 10 microns in size for the purposes of this invention. When the metallized cords are stripped from the backing member they are completely conductive electrically and completely sheathed individually in metal prior to use as electrode strip material.

I find that according to this invention I can get an equal strength electrode strip material using one half the fibrous raw material presently used in woven form and can eliminate the cost of weaving entirely and can secure the capacity obtainable with a like amount of particulate metal in a woven electrode as well as to produce an electrode which can be torn on a straight line lengthwise and thereby eliminate slitting requiring an expensive machine operation.

It is preferred to have every cord surrounded by and sheathed in the particulate metal.

It is also contemplated to spray multiple layers of parellel cords superimposed and then part these layers and respray.

Spreading particulate metal on one or more layers of parallel cords and sintering and, or fusing to coalesce the metal and cords or a combination of these methods with spraying is contemplated also.

Constant and uniform tension on the cords during bonding is desirable.

Having described my invention, I claim:

1. An electrode strip for electrodes of electrolytic devices comprising a pair of spaced parallel twisted cords, one positioned adjacent one side edge of the strip and the other positioned at the opposite side edge of the strip, and a plurality of finely divided metal particles at least partially coating and completely embedding said cords and being the sole material filling the space between said cords to form a reinforced metal layer, and between the strands forming the twisted cords, said metal particles being bonded together and bonding the strands of the cords together and bonding the cords together.

2. An electrode strip for electrodes of electrolytic devices comprising a pair of spaced parallel cords, one positioned adjacent one side edge of the strip and the other positioned at the opposite side edge of the strip, and a plurality of finely divided metal particles coating and completely embedding said cords and being the sole material filling the space between said cords to form a reinforced metal layer, and between the strands forming the cords, said metal particles being bonded together and bonding the strands of the cords together and bonding the cords together.

3. An electrode strip according to claim 2 in which the cords are conductive.

References Cited in the file of this patent
UNITED STATES PATENTS

| | | |
|---|---|---|
| 2,297,607 | Blackburn | Sept. 29, 1942 |
| 2,297,608 | Blackburn | Sept. 29, 1942 |
| 2,375,211 | Brennan | May 8, 1945 |
| 2,439,137 | Keller | Apr. 6, 1948 |
| 2,446,524 | Brennan | Aug. 10, 1948 |
| 2,578,667 | Brennan | Dec. 18, 1951 |
| 2,582,744 | Brennan | Jan. 15, 1952 |
| 2,609,320 | Modigliani | Sept. 2, 1952 |
| 2,616,165 | Brennan | Nov. 4, 1952 |
| 2,699,415 | Nachtman | Jan. 11, 1955 |